(12) United States Patent
Nagakura et al.

(10) Patent No.: US 6,751,848 B2
(45) Date of Patent: Jun. 22, 2004

(54) METHOD FOR ADJUSTING A RESISTANCE VALUE OF A FILM RESISTOR

(75) Inventors: Syunsuke Nagakura, Shizuoka (JP); Manabu Ooishi, Shizuoka (JP); Hisafumi Maruo, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/180,061

(22) Filed: Jun. 27, 2002

(65) Prior Publication Data
US 2003/0000071 A1 Jan. 2, 2003

(30) Foreign Application Priority Data

Jun. 28, 2001 (JP) ..................... P2001-196962

(51) Int. Cl.[7] .................... H01C 17/00; H01C 10/00
(52) U.S. Cl. .................. 29/610.1; 29/593; 29/619; 29/620; 338/195
(58) Field of Search ................ 29/593, 610.1, 29/616, 619, 620; 73/313, 308, 304 R, 319; 338/195, 162, 309

(56) References Cited

U.S. PATENT DOCUMENTS

| | | | |
|---|---|---|---|
| 4,931,764 A | * | 6/1990 | Gaston ...................... 338/185 |
| 5,051,719 A | * | 9/1991 | Gaston et al. ............... 338/162 |
| 5,267,475 A | * | 12/1993 | Gaston ........................ 73/319 |
| 5,272,918 A | * | 12/1993 | Gaston et al. ............ 73/290 R |
| 5,743,136 A | * | 4/1998 | Gaston et al. ................ 73/313 |
| 5,747,689 A | * | 5/1998 | Hampo et al. ............ 73/304 C |

FOREIGN PATENT DOCUMENTS

EP        0 766 074 A2     4/1997

OTHER PUBLICATIONS

Patent Abstracts of Japan, Publication No. 61119069, Jun. 6, 1986; Matsushita Electric Ind Co., Ltd.
"Multiple Lasert Trimmed Resistors", Grunwell, vol. 9, Aug. 1989; 8182 Motorola Technical Developments.
"Laser Trimming Active Resistors to Improve Precision and Productivity", Dobbins, et al., Electronic Packaging & Production, Oct. 31, 1991.

* cited by examiner

*Primary Examiner*—Carl J. Arbes
*Assistant Examiner*—Tai Nguyen
(74) *Attorney, Agent, or Firm*—Sughrue Mion, PLLC

(57) ABSTRACT

A method of adjusting a resistance value of a film resistor. The method includes defining, as a single resistive element, a portion of a resistive film formed over a first linear conductive film formed at a position at which a first resistance value is detected when an electric contact is slid thereto, and a second linear conductive film formed at a position at which a second resistance value is detected when the electric contact is slid thereto. The method also includes trimming a portion of the resistive element at opposite sides of the first linear conductive film in a longitudinal direction substantially perpendicular to the width direction to form first and second trimmed portions; and trimming a portion of the resistive element from an end of the second trimmed portion in the width direction toward the second linear conductive film to form a third trimmed portion.

6 Claims, 1 Drawing Sheet

METHOD FOR ADJUSTING A RESISTANCE VALUE OF A FILM RESISTOR

BACKGROUND OF THE INVENTION

The present invention relates to a resistance value adjusting method for adjusting the electric resistance value of a resistor which has a resistive film formed on a plurality of linear conductive films, and an electric contact which is slid in a width direction of the linear conductive films to change the resistance value.

Conventionally, a resistor for a fuel gauge is known for presenting a driver the amount of fuel remaining in a fuel tank equipped, for example, in a vehicle. As illustrated in FIG. 3, this resistor for a fuel gauge has a plurality of linear conductive films 101 formed on a substrate in a film shape such that they are arranged in parallel, and a resistive film 102 formed on the linear conductive films 101 in a film shape. Generally, the fuel gauge is required to have a resolution of approximately 40–60, and therefore the resistive film 102 must be formed to support the resolution.

In such a resistor for a fuel gauge, an electrode is formed, for example, at an end 101a of the right-most linear conductive film of the plurality of linear conductive films 101, and an electric contact is slid in a width direction on portions of the linear conductive films 101 in which the resistive film 102 is not formed, thereby establishing an electric conduction between the electric contact and electrode.

In the resistor for a fuel gauge, in order to provide a different resistance value when the electric contact comes into contact with a different linear conductive film 101, portions of the resistive film 102 existing between the respective linear conductive films 101 are trimmed to form trimmed portions 103.

In this manner, as the electric contact comes closer to the end 101a of the linear conductive film, for example, due to a gradually reduced amount of fuel in the fuel tank, the resistive file between the electric contact and the end 101a of the linear conductive film is reduced to cause a lower resistance value, so that a larger current flows, and a display on the fuel gate is changed in accordance with the current value.

The aforementioned resistor for a fuel gauge has several points such as E (EMPTY) point, ¼ point, ½ point, ¾ point, F (FULL) point and the like as management points which function as marks for presenting the amount of remaining fuel to the driver.

As a fuel gauge, a needle for indicating the amount of remaining fuel preferably exhibits a linear characteristic, for which all portions of the resistive film between the respective linear conductive films 101 are trimmed to form the trimmed portions 103. Therefore, with the conventional resistor for a fuel gauge, a trimming step for adjusting the resistance value must be performed in all the portions of the resistive film between the respective linear conductive films 101, resulting in a low working efficiency.

SUMMARY OF THE INVENTION

Thus, the present invention has been made in view of the foregoing circumstance, and it is an object to provide a resistance value adjusting method which is capable of efficiently adjusting the resistance value of a resistive film in a resistor.

In order to solve the aforesaid object, the invention is characterized by having the following arrangement.

(1) A method of adjusting a resistance value of a film resistor which includes a plurality of linear conductive films formed in parallel on a substrate, and a resistive film formed over portions of the plurality of linear conductive films in a width direction of the linear conductive films, wherein an electric contact is slid over the plurality of linear conductive films to change a detected resistance value, the method comprising the steps of:

defining, as a single resistive element, a portion of the resistive film formed over a first linear conductive film formed at a position at which a first resistance value is detected when the electric contact is slid thereto, and a second linear conductive film formed at a position at which a second resistance value is detected when the electric contact is slid thereto, the first and second linear conductive films interposing a plurality of the linear conductive films;

trimming a portion of the resistive element at opposite sides of the first linear conductive film in a longitudinal direction substantially perpendicular to the width direction to form first and second trimmed portions; and trimming a portion of the resistive element from an end of the second trimmed portion in the width direction toward the second linear conductive film to form a third trimmed portion.

(2) The method according to (1), wherein the first trimmed portion is trimmed so as to adjust a resistance value, detected when the electric contact is slid to the first linear conductive film, to the first resistance value.

(3) The method according to (1) or (2), wherein the second trimmed portion has a length which is determined based on the number of the linear conductive films formed between the first and second linear conductive films.

(4) The method according to (1) through (3), wherein the third trimmed portion is trimmed so as to adjust a resistance value detected when the electric contact is slid on the linear conductive films formed between the first and second linear conductive films.

(5) The method according to (1) further comprising the step of:

trimming a portion of the resistive element in the vicinity of the second linear conductive film in the longitudinal direction to form a fourth trimmed portion.

(6) The method according to (5), wherein the fourth trimmed portion is trimmed so as to adjust a resistance value, detected when the electric contact is slid to the second linear conductive film, to the second resistance value.

DETAILED DESCRIPTION OF THE PREFERRED EMBODIMENTS

In the following, an embodiment of the present invention will be described with reference to the drawings.

Figure 1:
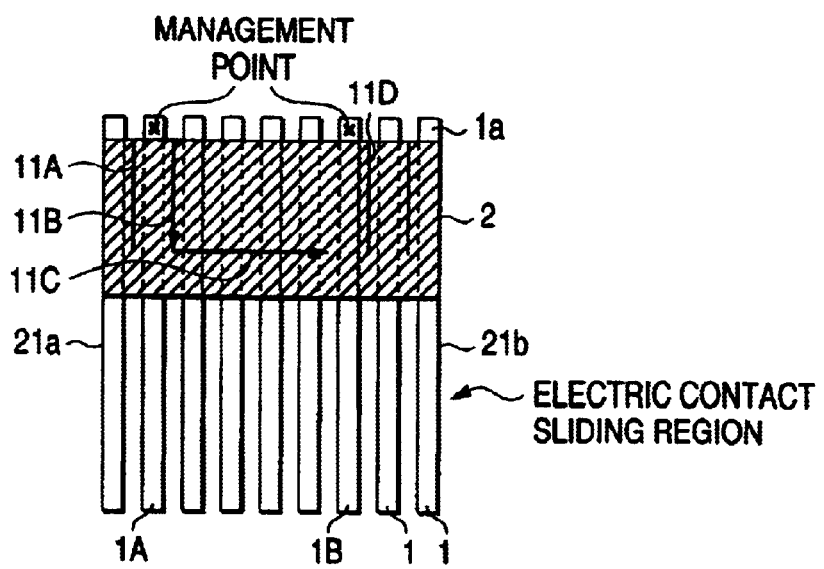
FIG. 1 is a diagram for explaining how a film resistor is trimmed in accordance with a resistance value adjusting approach to which the present invention is applied.

The present invention is applied for creating a film resistor which is configured, for example, as illustrated in FIG. 1.

The film resistor is used for a fuel gauge which presents a driver the amount of remaining fuel in a fuel tank equipped, for example, in a vehicle. The film resistor for the fuel gauge has a plurality of linear conductive films 1 formed on a substrate in a film shape such that they are arranged in parallel, and a resistive film 2 formed over the plurality of linear conductive film 1 in a film shape. FIG. 1 shows only some of the linear conductive films 1 though there is a number of the linear conductive films 1 corresponding to a resolution required for the fuel gauge. Generally, the resolution required for a fuel gauge is approximately in a range of 40 to 60.

In such a film resistor, an electrode is formed, for example, at an end 1a of the rightmost linear conductive film, and an electric contact is slid in a width direction of the linear conductive films 1 in their portions in which the resistive film 2 is not formed, i.e., from one end 21a to the other end 21b of the film resistor, thereby establishing an electric conduction between the electric contact and electrode.

In this film resistor, in order to provide a different resistance value when the electric contact comes into contact with a different linear conductive film 1, portions of the resistive film 2 existing between the respective conductive films 1 are trimmed to form trimmed portions.

In this manner, as the electric contact comes closer to the end 1a of the linear conductive film, for example, due to a gradually reduced amount of fuel in the fuel tank, the resistive film between the electric contact and the end 1a of the linear conductive film is reduced to cause a lower resistance value, so that a larger current flows, and a display on the fuel gate is changed in accordance with the current value.

In the state that this film resistor is equipped in a vehicle, the electric contact is slid in the width direction of the linear conductive films 1 in an electric contact sliding region on the linear conductive films to change a detected resistance value.

When such a film resistor is manufactured, the linear conductive films 1 are first deposited on a substrate, and the resistive film 2 is deposited on the resulting linear conductive films 1. Next, portions of the resistive film 2 existing between the linear conductive films 1 are trimmed for increasing a tolerance for the resistance value when the electric contact comes into contact with each linear conductive film 1 as the electric contact is slid on the respective linear conductive films 1 in the electric contact sliding region from one end 21a to the other end 21b.

In this event, in the linear conductive films 1, for example, for a fuel gauge, several points such as E (EMPTY) point, ¼ point, ½ point, ¾ point, F (full) point and the like are set as management points which function as indicia for presenting the amount of remaining fuel to the driver. Assume herein that the linear conductive films 1 with "X" points written therein, shown in FIG. 1, correspond to the management points.

Then, the resistive film 2 formed over a first linear conductive film 1A and a second linear conductive film 1B is defined as a single resistive film block. The first linear conductive film 1A is formed at a position at which a management point is set and a first resistance value is detected when the electric contact is slid thereto. The second linear conductive film 1B is formed through this first linear conductive film 1A and a plurality of linear conductive films at a position at which a management point is set and a second resistance value is detected when the electric contact is slid thereto.

Here, four linear conductive films 1 are formed between the linear conductive film 1A and linear conductive film 1B in the resistive film block, and the resistive film block must be trimmed such that the resistance value changes in five stages while the electric contact is slid from the linear conductive film 1A to the linear conductive film 1B. In other words, within a change in the resistance value in the single resistive film block, a change in resistance required when the electric contact is slid to an adjacent linear conductive film 1 is ⅕ as much as the change in the resistance value provided by the overall resistive film block (linear conductive film 1A to linear conductive film 1B).

Therefore, by trimming the resistive film 2 near one end 21a of the linear conductive film 1A in the longitudinal direction to form a trimmed portion 11A, a resistance value detected when the electric contact is slid to the first linear conductive film 1A is adjusted to the first resistance value.

Next, based on the number (for in this example) of linear conductive films formed between the first linear conductive film 1A and second linear conductive film 1B, the resistive film near the other end 21b of the first conductive film 1A is trimmed by a length determined therefor in the longitudinal direction to form a trimmed portion 11B.

Next, the resistive film 2 is trimmed to form a trimmed portion 11C. The trimmed portion 11C extends from an end of the trimmed portion 11B at the other end 21b side of the first linear conductive film toward the second linear conductive film 1B in the width direction of the linear conductive film 1. In this manner, the resistive film 2 is adjusted such that the resistance value varies in a linear fashion when the electric contact is slid on the linear conductive films 1 between the first linear conductive film 1A and second linear conductive film 1B.

Next, the resistive film 2 is trimmed to form a trimmed portion 11D such that the second resistance value is detected when the electric contact is slid onto the second linear conductive film 1B. The trimmed portion 11D formed at the other end 21b side of the second linear conductive film 1b and extends in the longitudinal direction.

In this manner, by trimming the resistive film 2 in the width direction of the linear conductive films 1 to adjust the resistance value, the number of times the trimming is performed can be reduced in a film resistor which has three or more linear conductive films 3 between management points, thereby making it possible to efficiently adjust the resistance value of the resistive film 2.

Figure 2:
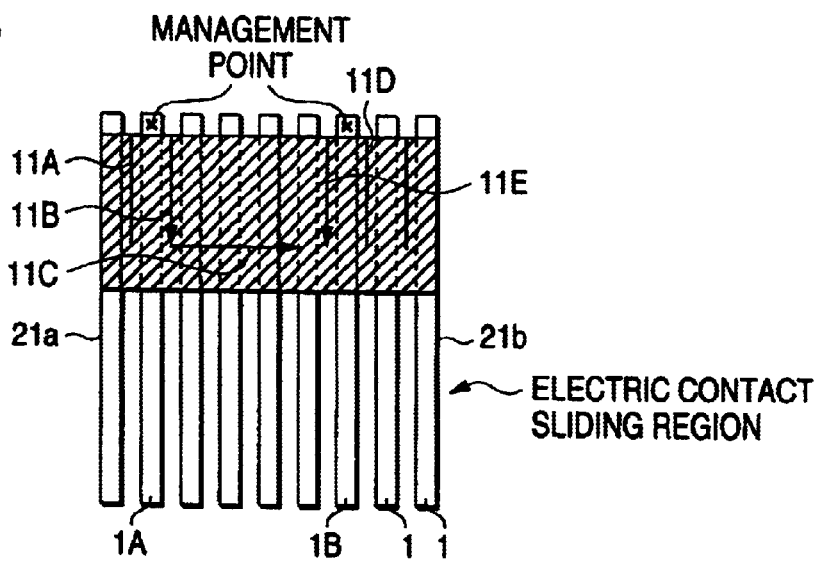
FIG. 2 is a diagram for explaining how a film resistor is trimmed in accordance with another resistance value adjusting approach to which the present invention is applied.
Figure 3:
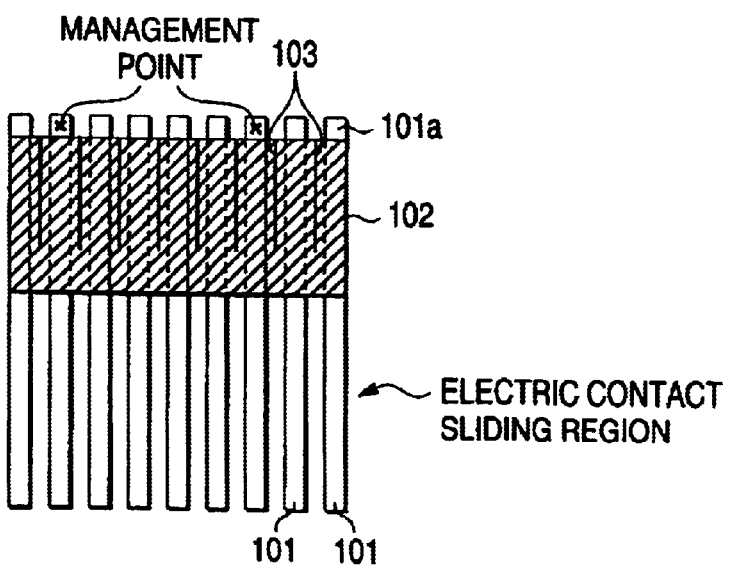
FIG. 3 is a diagram for explaining a conventional resistance value adjusting approach.

Other than the example in which the resistive film is trimmed as illustrated in FIG. 1, when a small tolerance is provided for a resistance value at a management point, the resistive film is trimmed as illustrated in FIG. 2 to adjust the resistance value.

More specifically, the resistive film 2 is trimmed to form a trimmed portion 11B. The trimmed portion 11b is formed at the other end 21b side of the first linear conductive film 1A and extends in the longitudinal direction. Then, the resistive film 2 is trimmed to form a trimmed portion 11C. The trimmed portion 11C extends from an end of the trimmed portion 11B to the one end 21a side of the linear conductive film 1B in the width direction of the linear conductive film 1. In this manner, the trimmed portion 11C is formed from an end point of the trimmed portion 11B to the resistive film 2 near the one end 21a of the second linear conductive film 1B.

Next, the resistive film 2 near the one end 21a of the second linear conductive film 1B is trimmed in the longitudinal direction to form a trimmed portion 1E to adjust a resistance value detected when the electric contact is slid to the second linear conductive film 1B to the second resistance value.

In this manner, the approach for trimming the resistive film 2 to adjust the resistance value involves trimming the resistive film 2 to two linear conductive films before the second linear conductive film 1B, and finally trimming the resistive film 2 near the one end 21a of the management point to form the trimmed portion 11D in the longitudinal direction until the second resistance value is reached, thereby making it possible to efficiently and accurately adjust the resistance value of the resistive film 2.

As appreciated, the foregoing embodiment is a mere example of the present invention. Therefore, it should be understood that the present invention is not limited to the foregoing embodiment and can be modified in a variety of manners depending on the design and the like, other than the embodiment, without departing from the technical idea according to the present invention.

According to the resistance value adjusting method of the invention, the resistive element near one end of the first linear conductive film with respect to the second linear conductive film is trimmed in a longitudinal direction to adjust a resistance value detected when the electric contact is slid to the first linear conductive film to the first resistance value, a length of the resistive element to be trimmed in the longitudinal direction near the other end of the first linear conductive film close to the second linear conductive film is determined based on the number of linear conductive films formed between the first linear conductive film and the second linear conductive film, and the resistive element is trimmed, and the resistive element is trimmed from an end point to which the resistive element has been trimmed near the end of the first conductive film close to the second linear conductive film toward the second linear conductive film in the width direction of the linear conductive films to adjust a resistance value when the electric contact is slid on the linear conductive films formed between the first linear conductive film and the second linear conductive film, so that the number of times of trimming can be reduced to efficiently adjust the resistance value of the resistive element.

According to the resistance value adjusting method of the invention, the resistive element is trimmed from an endpoint at which the resistive element has been trimmed near the end of the first linear conductive film close to the second linear conductive film toward the second linear conductive film in the width direction of the linear conductive films to trim the resistive film up to the end of the second linear conductive film close to the first conductive film, and the resistive element near the second linear conductive film close to the first linear conductive film is trimmed in the longitudinal direction to adjust a resistance value detected when the electric contact is slid to the second linear conductive film to the second resistance value, thus making it possible to efficiently and accurately adjust the resistance value of the resistive element.

What is claimed is:

1. A method of adjusting a resistance value of a film resistor which includes a plurality of linear conductive films formed in parallel on a substrate, and a resistive film formed over portions of the plurality of linear conductive films in a width direction of the linear conductive films, wherein an electric contact is slid over the plurality of linear conductive films to change a detected resistance value, the method comprising the steps of:

defining, as a single resistive element, a portion of the resistive film formed over a first linear conductive film formed at a position at which a first resistance value is detected when the electric contact is slid thereto, and a second linear conductive film formed at a position at which a second resistance value is detected when the electric contact is slid thereto, wherein a plurality of the linear conductive films are interposed between the first and second linear conductive films;

trimming a portion of the resistive element at opposite sides of the first linear conductive film in a longitudinal direction substantially perpendicular to the width direction to form first and second trimmed portions; and trimming a portion of the resistive element from an end of the second trimmed portion in the width direction toward the second linear conductive film to form a third trimmed portion.

2. The method according to claim 1, wherein the first trimmed portion is trimmed so as to adjust a resistance value, detected when the electric contact is slid to the first linear conductive film, to the first resistance value.

3. The method according to claim 1, wherein the second trimmed portion has a length which is determined based on the number of the linear conductive films formed between the first and second linear conductive films.

4. The method according to claim 1, wherein the third trimmed portion is trimmed so as to adjust a resistance value detected when the electric contact is slid on the linear conductive films formed between the first and second linear conductive films.

5. The method according to claim 1 further comprising the step of:

trimming a portion of the resistive element in the vicinity of the second linear conductive film in the longitudinal direction to form a fourth trimmed portion.

6. The method according to claim 5, wherein the fourth trimmed portion is trimmed so as to adjust a resistance value, detected when the electric contact is slid to the second linear conductive film, to the second resistance value.

* * * * *